United States Patent [19]
Becker et al.

[11] Patent Number: 5,153,554
[45] Date of Patent: Oct. 6, 1992

[54] LOW VOLTAGE VARISTOR ARRAY

[75] Inventors: Paul Becker, San Bruno; Mark Thompson, San Carlos; Lawrence J. White, Newark, all of Calif.

[73] Assignee: Raychem Corp., Menlo Park, Calif.

[21] Appl. No.: 520,590

[22] Filed: May 8, 1990

[51] Int. Cl.⁵ .............................................. H01C 7/10
[52] U.S. Cl. ...................................... 338/21; 252/521
[58] Field of Search ................... 338/20, 21; 361/117, 361/118, 126, 127, 128; 252/521, 513, 512

[56] References Cited

U.S. PATENT DOCUMENTS

| | | |
|---|---|---|
| 3,195,091 | 7/1965 | Kujawa et al. |
| 3,496,512 | 2/1970 | Matsuoka |
| 4,157,527 | 5/1979 | Phillipp ............................ 338/21 |
| 4,169,071 | 9/1979 | Eda et al. ......................... 252/517 |
| 4,233,603 | 11/1980 | Castleberry |
| 4,364,021 | 12/1982 | Levinson |
| 4,490,014 | 12/1984 | Levinson ...................... 338/21 X |
| 4,525,709 | 6/1985 | Hareng et al. .................... 340/719 |
| 4,535,327 | 8/1985 | Hareng et al. |
| 4,828,370 | 5/1989 | Suzuki ............................. 350/339 |

FOREIGN PATENT DOCUMENTS

| | | |
|---|---|---|
| 337711 | 10/1989 | European Pat. Off. |
| 2512239 | 3/1983 | France |
| 8802921 | 4/1988 | PCT Int'l Appl. |

Primary Examiner—Marvin M. Lateef

[57] ABSTRACT

An article having an array of varistors, including (a) a varistor body made of varistor material and having two major opposing faces, one of the opposing faces having an array of indentations thereon; (b) conductor material on the opposing face having the indentations, the conductor material filling the indentations and forming multiple leads for connection to electrical circuitry; and (c) conductor material on the other opposing face, forming multiple leads for connection to electrical circuitry.

4 Claims, 8 Drawing Sheets

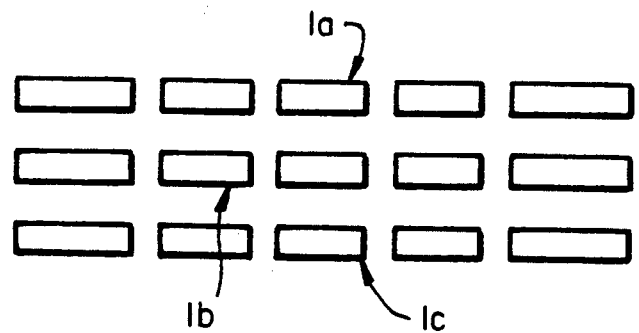
FIG_1a
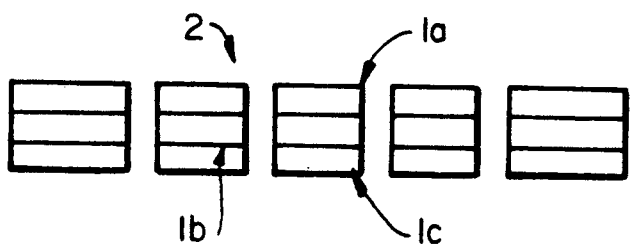
FIG_1b
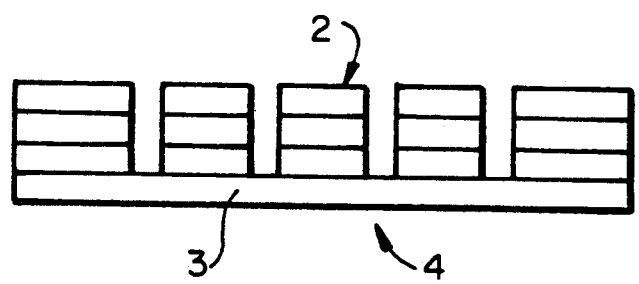
FIG_1c

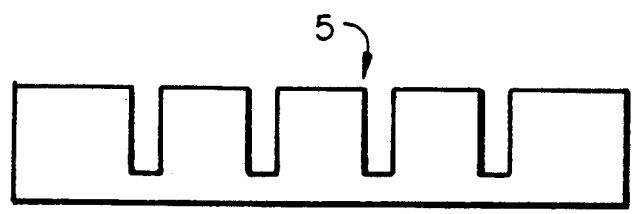
FIG_1d
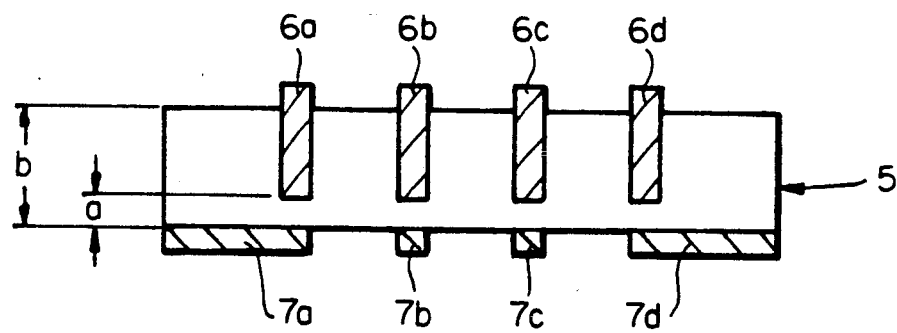
FIG_1e
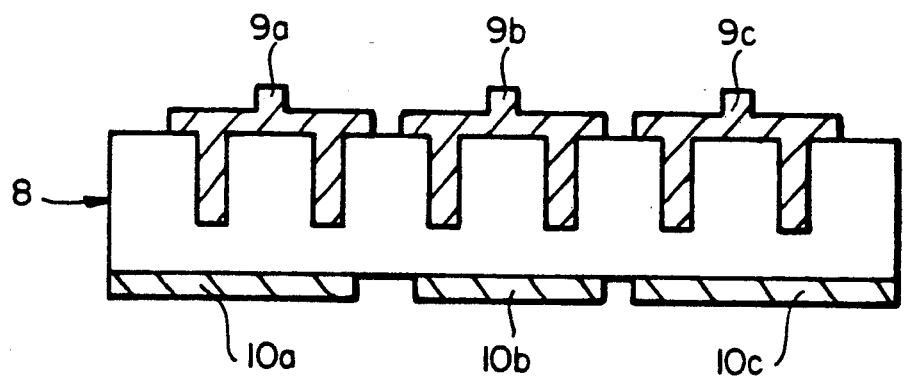
FIG_2

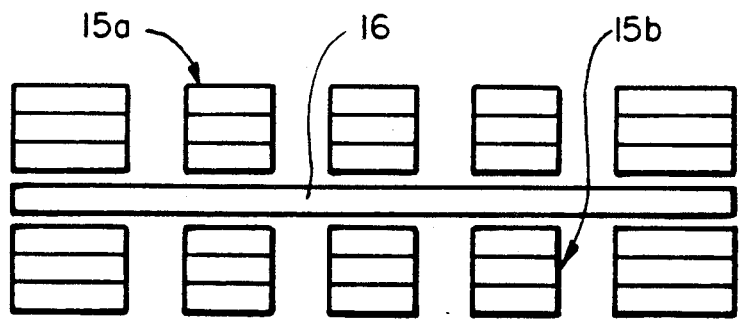
FIG_3a
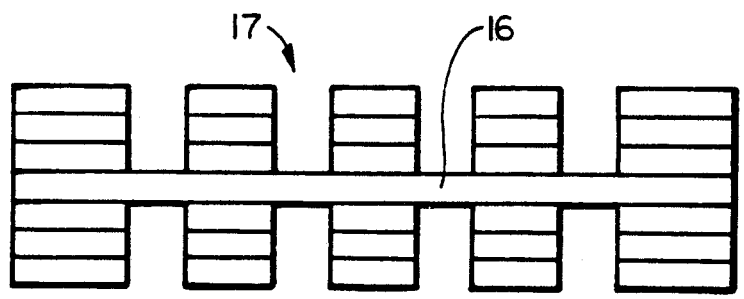
FIG_3b
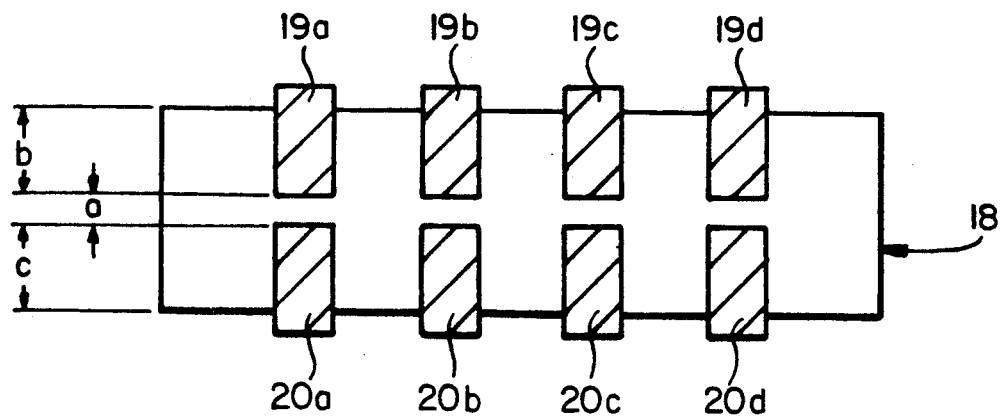
FIG_3c

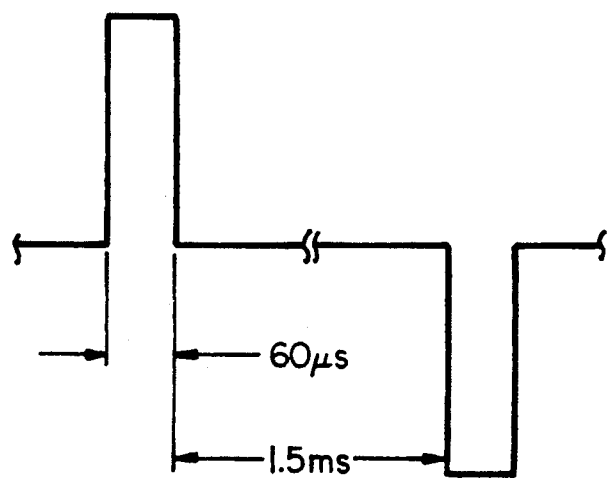
FIG_4
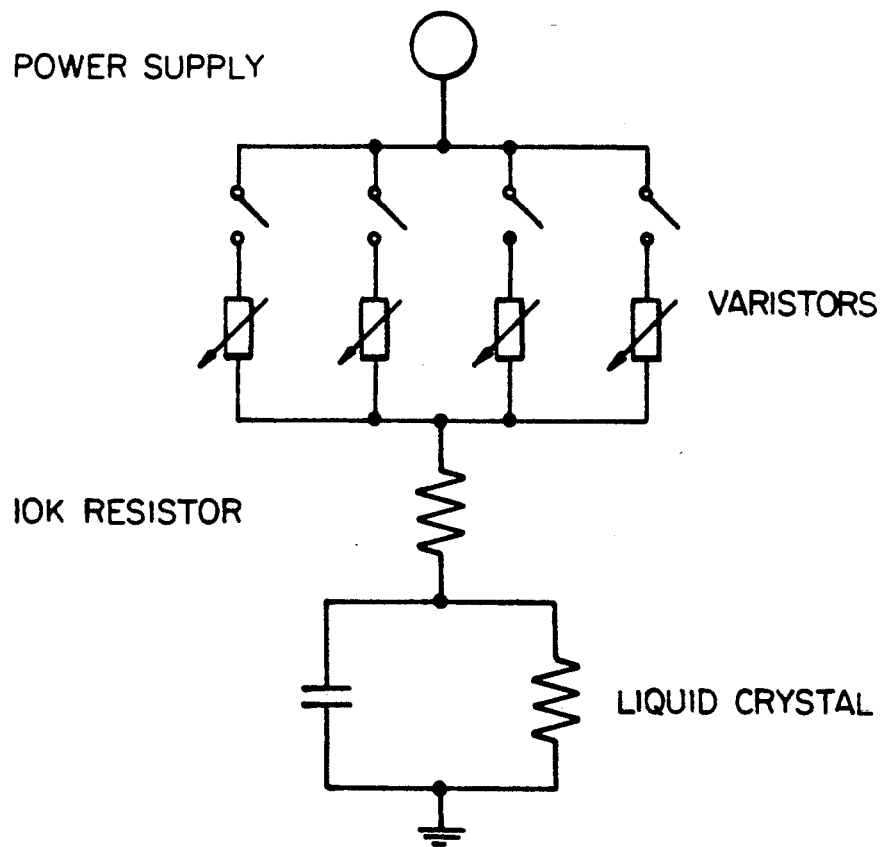
FIG_6

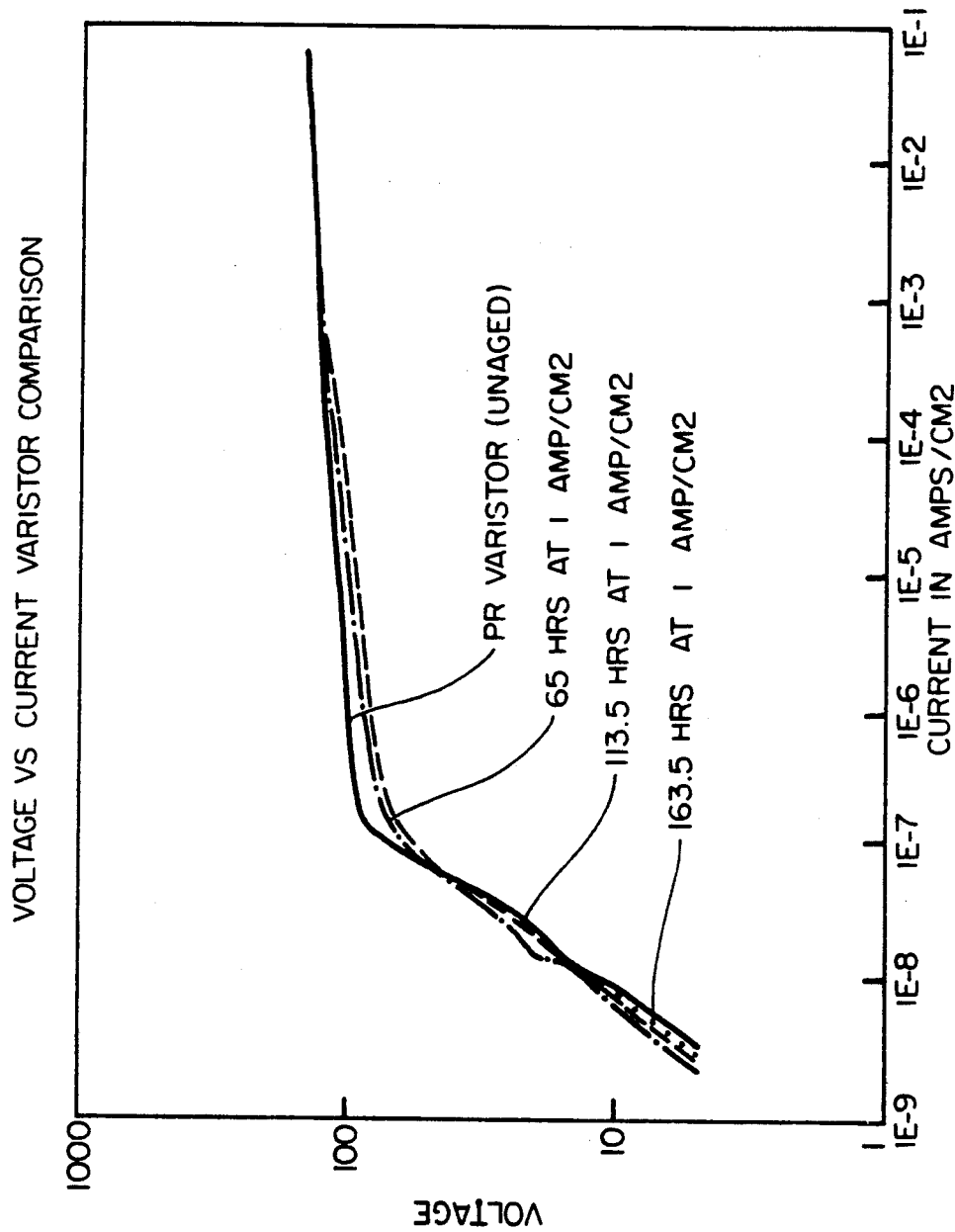
FIG_5a

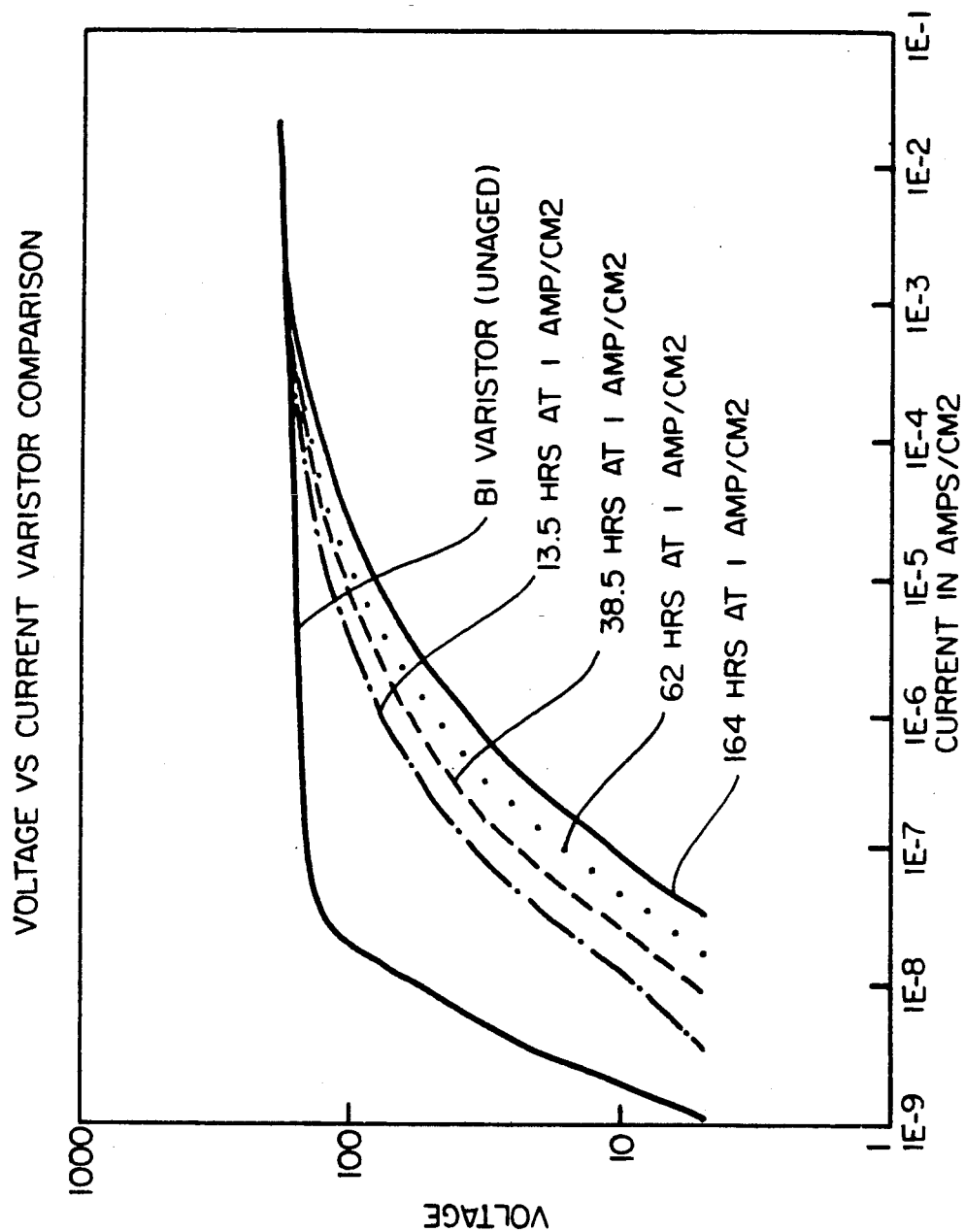

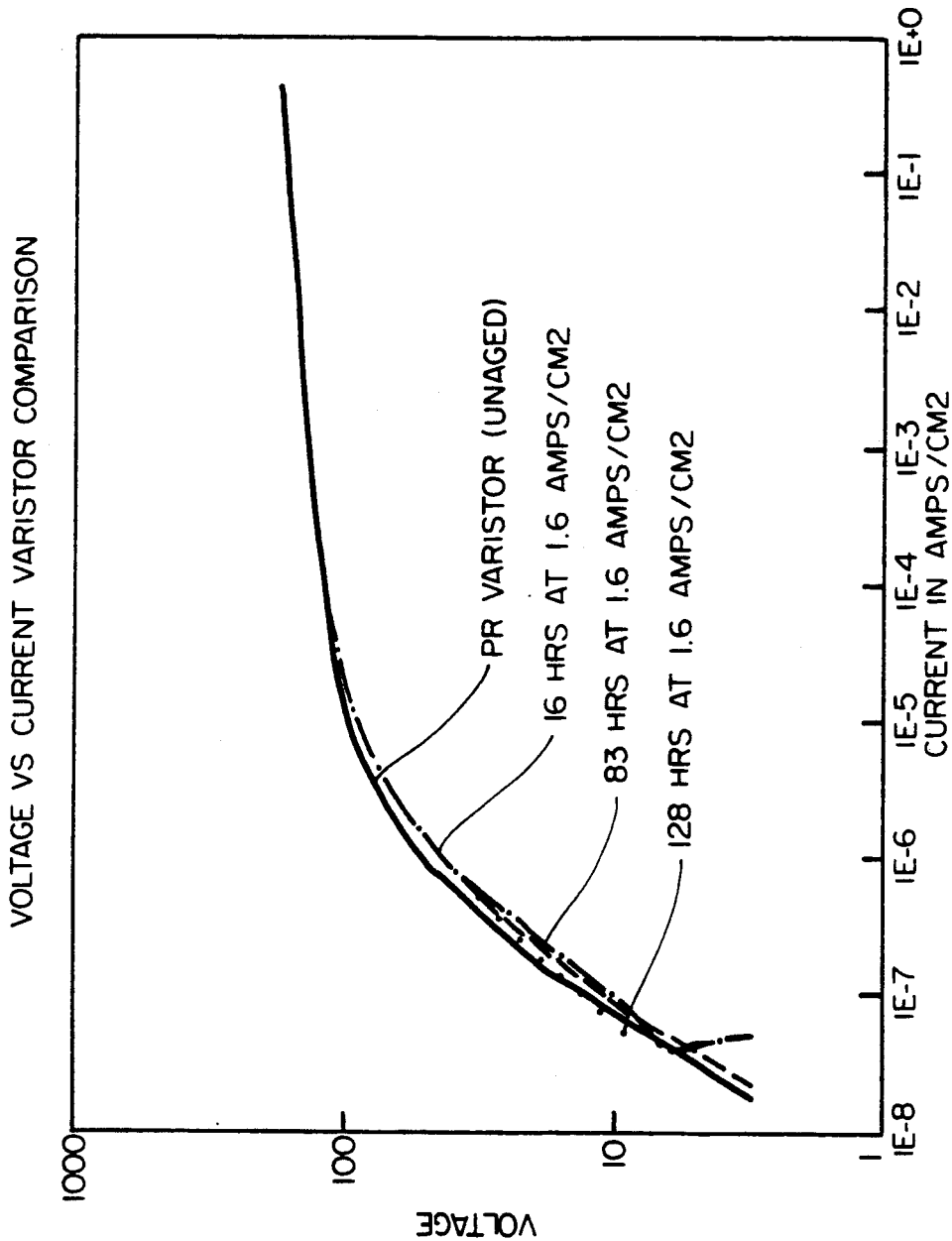
FIG_7a

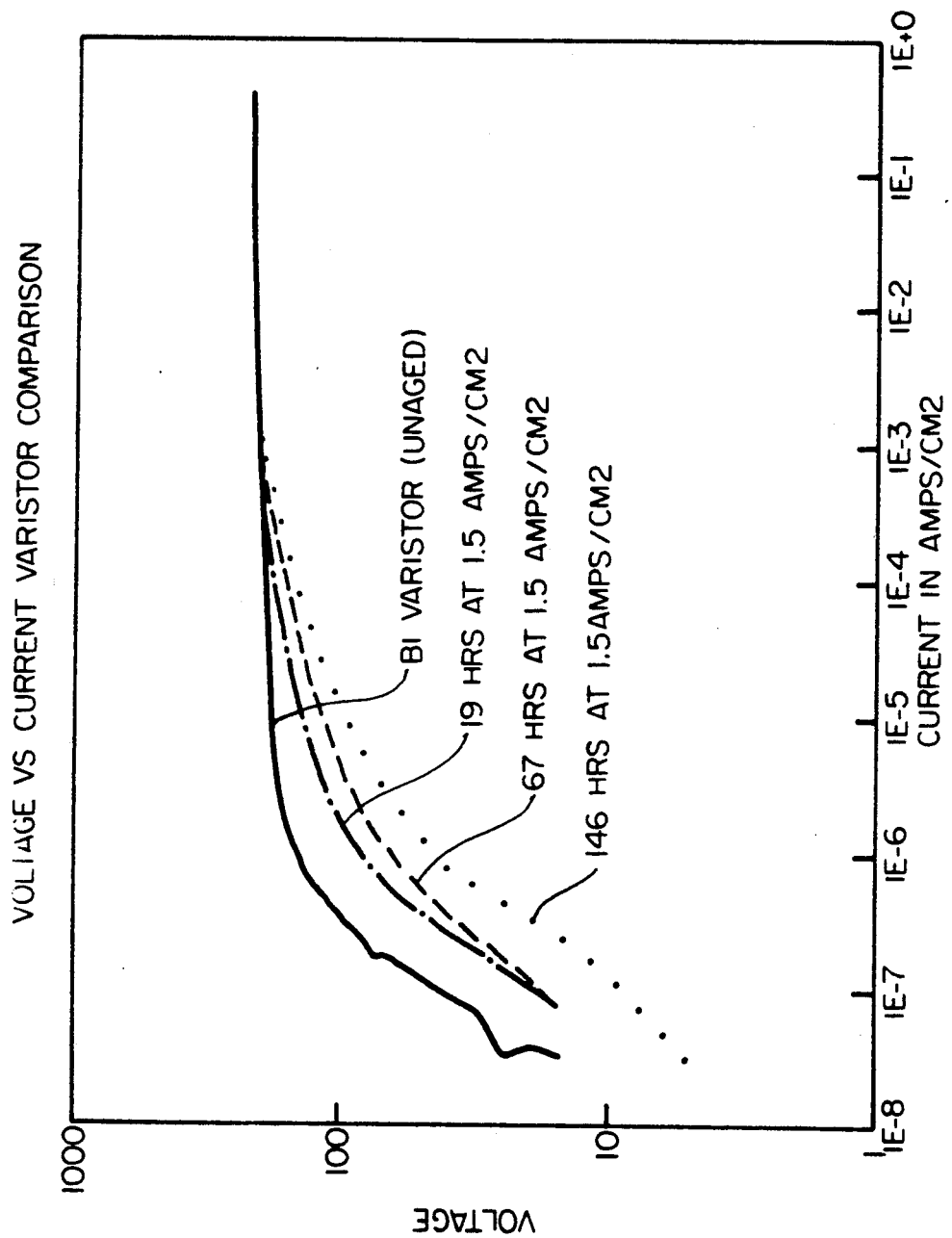

LOW VOLTAGE VARISTOR ARRAY

BACKGROUND OF THE INVENTION

This invention relates to low voltage varistor arrays and methods for making the same.

A metal oxide varistor is a nonlinear electrical device—that is, it exhibits a nonlinear voltage-current behavior. Below a certain voltage, commonly called the breakdown voltage ($V_b$) or the threshold voltage, the varistor is highly resistive, in the megohm range. When the breakdown voltage is exceeded, the resistance of the varistor decreases dramatically, and the varistor conducts large amounts of current. The voltage-current relationship of a varistor is described by the equation $$I = \left(\frac{V}{C}\right)^\alpha$$

where I is the current flowing through the varistor; V is the voltage across the varistor; C is a constant which is a function of the dimensions, composition, and method of fabrication of the varistor; and $\alpha$ is a constant which is a measure of the nonlinearity of the varistor. A large $\alpha$, signifying a large degree of nonlinearity, is desirable. High quality varistors typically have an $\alpha$ between 20 and 50.

Varistors generally are polycrystalline sintered ceramics of zinc oxide, containing additionally minor amounts of oxides of bismuth, cobalt, manganese, antimony, tin and/or other metals. Varistors can also be made of other materials such as strontium titanate or silicon carbide. The varistor precursor material is formed into a desired shape (the green body), optionally with the aid of binders, and sintered at an elevated temperature such as 1000°–1400° C. to develop the characteristic multigrain structure responsible for the varistor properties. The preparation of zinc oxide varistors has been extensively described, for example in Thompson et al., WO 88/02921 (1988) and Matsuoka et al., U.S. Pat. No. 3,496,512 (1970).

Varistors find a number of applications. Their use as surge arrestors is well known. Varistors have also been proposed as the switching elements in liquid crystal displays. Castleberry, U.S. Pat. No. 4,233,603 (1980), and Hareng et al., U.S. Pat. No. 4,535,327 (1985) disclose the use of varistors in multiplexed liquid crystal displays. Yoshimoto et al., EP 337,711 (1989), disclose varistors as switching elements in multiplexed encapsulated liquid crystal displays.

For liquid crystal display applications, varistors with lower breakdown voltages, on the order of about 60 volts, are advantageous. It is theorized that the breakdown voltage of a varistor is related to its thickness and the size of the crystalline grains. Each boundary between adjacent grains additively contributes a localized breakdown voltage to the overall breakdown voltage. For example, a varistor 1.5 mm thick and having an average grain size of 30 microns has an average of 50 grain boundaries across its thickness. Each grain boundary contributes about 3 volts to the overall breakdown voltage, so that such a varistor would have a breakdown voltage of about 150 volts.

One way to lower the breakdown voltage is to reduce the thickness of the varistor. However, the resulting varistor lacks mechanical strength, fracturing readily. In a multiplexed liquid crystal display application, each pixel is controlled by a varistor. A display having M rows and N columns of pixels would require M×N varistors. The failure of a few varistors among this large number can unacceptably degrade picture quality, so that rugged and reliable varistors are necessary.

An alternative way to reduce the breakdown voltage is to increase the grain size, thereby reducing the number of grain boundaries for a given thickness. Towards this end, the addition of titanium dioxide grain growth accelerators has been proposed. However, varistors so made are susceptible to current channeling through the varistor, due to local exaggerated grain growth. The result is nonuniform current conduction across the varistor's surface.

Levinson, in U.S. Pat. No. 4,364,021 (1982), discloses a varistor having a recessed region on one of its planar surfaces, to provide a region of reduced thickness and consequently lower breakdown voltage, while retaining the structural strength of a thicker varistor. However, Levinson relates to the preparation of individual varistors. For a multiplexed liquid crystal display, where a large array of varistors is required, one would then have to mount these individual varistors onto a supporting base, an inefficient step.

Kujawa et al., U.S. Pat. No. 3,195,091 (1965), discloses a silicon carbide non-linear resistor having plural leads attached to recesses on one surface thereof and a single lead attached to the other surface thereof.

It is desirable to make a large array of varistors, where the varistors have a low breakdown voltage and are rugged and suitable for use with multiplexed liquid crystal displays. It is further desirable to make arrays of varistors which are integral, that is, wherein the varistor elements do not require a separate supporting base of a different material. These and other objectives are achieved by the present invention. In the method of the present invention the precursor material can be handled as a green body, as opposed to a less convenient precursor powder.

SUMMARY OF THE INVENTION

This invention provides a method of making an article having an array of varistors, comprising the steps of
(a) providing a first sheet comprising a varistor precursor material;
(b) providing a second sheet comprising a varistor precursor material and having an array of openings extending across the thickness thereof;
(c) laminating the second sheet to the first sheet to form a laminate of the first and second sheets; and
(d) sintering the laminate to convert the varistor precursor material in the first and second sheets to varistor material.

This invention provides another method of making an article having an array of varistors, comprising the steps of
(a) providing a first sheet comprising a varistor precursor material;
(b) providing a second and a third sheet, each comprising varistor precursor material and having an array of openings extending across the thickness thereof;
(c) laminating the first, second and third sheets to form a laminate of the first, second, and third sheets, such that the first sheet is sandwiched between the second and third sheets and the openings in the second sheet are in registration with the openings in the third sheet; and (d) sintering the laminate to convert the varistor precursor material to varistor material.

This invention also provides an article having an array of varistors, comprising:

(a) a varistor body comprising varistor material and having two major opposing faces, one of the opposing faces having an array of indentations thereon;

(b) conductor material on the opposing face having the indentations, the conductor material filling the indentations and forming a plurality of leads for connection to electrical circuitry; and (c) conductor material on the other opposing face, forming a plurality of leads for connection to electrical circuitry.

Another article having an array of varistor elements provided by this invention comprises a varistor body comprising varistor material and having two major opposing faces, each of the opposing face having an array of indentations thereon, the indentations on each face being in registration with the indentations on the other face.

BRIEF DESCRIPTION OF THE DRAWING(S)

FIG. 1 shows schematically a method of this invention for making varistor arrays and a varistor array made by the method of this invention.

FIG. 2 and 3 show additional varistor arrays of this invention.

FIG. 4 shows the waveform for a video aging signal for testing the stability of varistors used in this invention.

FIG. 5a and 5b compare the stability of praseodymium and bismuth doped varistors.

FIG. 6 shows schematically a set-up for performing stability tests on varistors in conjunction with an encapsulated liquid crystal cell.

FIGS. 7a and 7b compare the stabilities of praseodymium and bismuth doped varistors when used to drive an encapsulated liquid crystal display cell.

DESCRIPTION OF THE PREFERRED EMBODIMENTS

Our invention is particularly advantageous with respect to arrays of low voltage varistors, which otherwise are difficult to prepare for the aforementioned reasons.

Referring now to FIG. 1, a schematic diagram of a method of this invention is shown. Sheets 1a-c (shown in cross-section) of varistor precursor material, each having an array of openings or vias extending across the respective thicknesses are stacked such that the openings are in registration. (For convenience, three such sheets are shown in FIG. 1, but more or less sheets, typically between 1 and 10, can be used.) In step A, sheets 1a-c are laminated to make a first green body 2, also having an array of openings extending therethrough. Green body 2 is in turn laminated with sheet 3 of varistor precursor material (step B), sheet 3 being free of openings, to form a second green body 4. Green body 4 is sintered (step C) to convert the varistor precursor material into varistor material, consolidating the various layers into an integral sintered body 5 made of varistor material and having indentations on one major face thereof. Sintered body 5 is metallized with conductor material 6a-d and 7a-d, to provide leads to electrical circuitry.

The varistor action is defined by the thickness a, which is the thickness b of sintered body 5 less the depth of the indentations. In many applications it will be sufficient or even desirable to make the dimensions a and b the same for each varistor element, i.e., making each varistor element have the same breakdown voltage. However, in some instances it may be desirable to have different dimensions for different varistor elements, resulting in varistors with different breakdown voltages in the array. Since the breakdown voltage of a varistor is proportional to its thickness, an array of relatively low voltage varistors is produced. However, because sintered body 5 has a much greater thickness b at most places, it is much more rugged than a simple varistor slab of thickness a. The indentations have been shown for convenience to be of uniform depth, but it is to be understood that a certain amount of variation in the depth from indentation to indentation is permissible. Preferably, thickness a is between about 0.02 and about 0.04 mm.

It is not necessary that green body 2 be made by the lamination of thinner sheets of precursor material 1a-c. If desirable, green body 2 can be integral, made of a single sheet or layer of varistor precursor material 1a of sufficient thickness. FIG. 1 also depicts, as a matter of convenience, green body 2 laminated to a single sheet 3, although plural sheets 3 can be used, depending on the dimensions desired for sintered body 5.

FIG. 1 shows a one-to-one correspondence between the number of indentations and the number of varistor elements. FIG. 2 shows another embodiment, in which each varistor of the array is defined not by a single indentation, but by plural indentations. In FIG. 2, varistor body 8 has conductors 9a-c and 10a-c deposited thereon forming plural leads to external circuitry. Each of conductors 9a-c fills two indentations in body 8.

FIG. 3 shows yet another embodiment of this invention. Via-containing green sheets 15a and 15b are used to sandwich a via-less green sheet 16 to make a further green body 17. Green body 17 is fired to make a monolithic varistor 18, having opposing indentations on its two faces. The varistor action is defined by the thickness a, which is given by the thickness of the overall varistor monolith 18 less the depth of the opposing indentations b and c, which may be the same or different. The construction of this embodiment has the advantage of placing the active varistor material away from any supporting substrate on which 17 green body is placed for the firing step, minimizing contamination and resulting in more reproducible varistor electrical properties. Further, any surface irregularity or roughness resulting from contact with the supporting substrate may be compensated for after firing by a sanding or polishing step without affecting the thickness of the active varistor material and, consequently, the breakdown voltage. Finally, the active varistor material would be expected to have more controllable properties, because it does not have a "top" and "bottom" side, and would not exhibit the assymetry due to slightly different processing environments, as might occur with the embodiment of FIG. 1.

Varistor material is generally made by the sintering of a varistor precursor material (in the form of a green sheet or body). The varistor precursor material can be made in any number of ways. Thompson et al, WO 88/02921 (1988), the disclosure of which is incorporated herein by reference, disclose a precipitation process for the preparation of a varistor precursor material comprising a primary metal oxide and one or more additive metal oxides by:

(a) forming an aqueous solution comprising up to about 25 mole % (based on additive metal oxide plus primary metal oxide) of at least one soluble precursor of an additive metal oxide;

(b) mixing in the aqueous solution up to about 75 mole % of at least one primary metal oxide powder having an average particle size up to about 5 microns to form a suspension or slurry of the primary metal oxide powder in the solution;

(c) adding to the suspension or slurry a sufficient amount of a precipitation reagent to cause one or more of the dissolved additive metal oxide precursors to convert to an oxide or hydrous oxide and precipitate from the solution in the presence of the primary metal oxide powder in the form of an oxide or hydrous oxide;

(d) removing water and by-product salts from the suspension of primary metal oxide powder and precipitate of additive metal oxide or hydrous oxide; and (e) drying the powder and precipitate and forming a metal oxide varistor powder.

Additional methods of preparing a varistor precursor material and varistor material therefrom are disclosed by Gupta et al., U.S. Pat. No. 4,094,061 (1978); Wong et al., U.S. Pat. No. 4,142,996 (1979); Douglas et al., U.S. Pat. No. 4,023,961 (1977); Pallila, U.S. Pat. No. 4,575,440 (1986); Lauf, U.S. Pat. No. 4,510,112 (1985); Kanai et al., U.S. Pat. No. 4,540,971 (1985); Brooks et al., U.S. Pat. No. 4,681,717 (1987); Osman et al., U.S. Pat. No. 4,767,729 (1988); and Eda et al., U.S. Pat. No. 4,551,268 (1985)

The green body can comprise additives such as plasticizers, solvents, binders, dispersants, surfactants, and the like, which normally can be used in making the green body. Typical suitable plasticizers include glycols (e.g., polypropylene glycol), phthalate esters (e.g., dioctyl phthalate and benzyl butyl phthalate), and long chain carboxylic acids (e.g., oleic and stearic acid), and mixtures thereof. Typical suitable binders include cellulose esters, long chain thermoplastic polymers such as poly(vinyl butyral), poly(vinyl acetate), and polymethyl methacrylate). Typical suitable surfactants include amine salts of alkyl aryl sulfonates, alkyl ethers of poly(ethylene glycol) such as the ethyl ether thereof, alkyl aryl polyether alcohols such as ethylphenyl glycol, polyoxyethylene acetate, and the like. Preferred additives are those which volatilize during the sintering process. Alternatively, the additives may be removed by a solvent extraction or leaching process.

The varistor precursor powder is converted to varistor material by sintering at a temperature between about 750° and 1500° C., preferably between about 900° and about 1100° C., depending on composition, grain size, and other characteristics desired in the resulting varistor material.. The sintering process may be according to a schedule whereby the temperature is gradually increased, with pauses at predetermined temperatures along the way.

As an example, a varistor array was made from green varistor tapes having a thickness of 16 mils. Three squares of green tape, each 1.25 by 1.25 inches, are cut out of a cast tape. Two of the squares were laminated together in a hydrostatic press at 75° C. and 1000 pounds ram force for 10 min. The laminate was then punched with an eight by eight matrix of holes, 0.062 inches in diameter and on 0.110 inch centers. The punched laminated was laminated to the third square, at 75° C. and 500 pounds ram force, for 10 min, to produce a final green laminate consisting of one solid active layer supported by two punched layers. The part was then fired as a unit to convert the green precursor material into varistor material.

The varistor material can be electroded in conventional ways, for example by painted silver electrodes or other conventional electrodes used with varistors. Other useful electrodes include indium gallium eutectic, aluminum and zinc electrodes. Conventional surface preparations, coatings, passivating coatings, and other additives or materials normally used with electroding varistors can be used with the varistor arrays of this invention.

Preferred varistor materials are based on zinc oxide as the primary (predominant) metal oxide, plus a few mole percent of additive metal oxides such as $Al_2O_3$, $B_2O_3$, $BaO$, $Bi_2O_3$, $CaO$, $CoO$, $Co_3O_4$, $Cr_2O_3$, $FeO$, $In_2O_3$, $K_2O$, $MgO$, $Mn_2O_3$, $Mn_3O_4$, $MnO_2$, $NiO$, $PbO$, $Pr_2O_3$, $Sb_2O_3$, $SiO_2$, $SnO$, $SnO_2$, $SrO$, $Ta_2O_5$, $TiO_2$, and mixtures thereof. The additive metal oxides can be used as dopants for modifying the properties of the varistor or as sintering aids. Preferred varistors are based on zinc oxide, cobalt oxide, and praseodymium oxide are much stabler and preferable for driving liquid crystal displays. Such varistors comprises zinc oxide as a primary metal oxide and cobalt and praseodymium oxides as additive metal oxides, in amounts of between 0.1 and 8.0 atom % cobalt and between 0.08 and 8.0 atom % praseodymium, each calculated as cobalt and praseodymium. More preferably, such varistors further comprise aluminum oxide in an amount of between 5 and 200 ppm Al (calculated as aluminum). The praseodymium oxide may used in any one of its various forms, which may be generically represented by the formula $PrO_x$, where x is between 1 and 2, for example $Pr_2O_3$, $Pr_6O_{11}$, or $PrO_2$. Instead of praseodymium oxide, terbium oxide may be used. Praseodymium varistors can be made by a coprecipitation process as disclosed in the aforementioned WO 88/02921. Praseodymium varistors and methods thereof are also disclosed in Nagasawa et al., U.S. Pat. No. 4,033,906 (1977). Preferably, the threshold voltages of the varistors are between about 20 and about 80 volts.

Additionally, varistor compositions can be based on titanium oxide ($TiO_2$), strontium oxide (SrO), strontium titanate ($SrTiO_3$), alone or in combination with each other or with zinc oxide, as the primary metal oxide.

The varistor arrays of this invention can be used to control multiplexed liquid crystal displays, which require arrays of large numbers of varistors. The liquid crystal display can be made from encapsulated liquid crystal material, whose preparation is disclosed in U.S. Pat. Nos. 4,435,047 (1984), 4,606,611 (1986), 4,616,903 (1986), and 4,707,080 (1987), all to Fergason; published European patent application EP 156,615 (1985), by Pearlman et al.; U.S. Pat. No. 4,671,618 (1987), to Wu et al.; U.S. Pat. Nos. 4,673,255 (1987) and 4,685,771 (1987), to West et al.; and U.S. Pat. No. 4,688,900 (1987) to Doane et al.; the disclosures of each which are incorporated herein by reference. In encapsulated liquid crystal material, discrete volumes of liquid crystals are encapsulated, dispersed, embedded or otherwise contained in a containment medium. "Liquid crystal" denotes a composition having liquid crystalline properties, whether that composition is a single discrete liquid crystalline compound, a mixture of of different liquid crystalline compounds, or a mixture of liquid crystalline and non-liquid crystalline compounds.

Alternatively, the liquid crystal display can be of the twisted nematic type, in which liquid cyrstals are used to affect the plane of polarization of light and cause the light to be absorbed or not be absorbed by polarizers in the display.

The varistor arrays of this invention are especially suitable for driving liquid crystal displays, because such displays generally require varistors with relatively low breakdown voltages, around 20 to 100 volts.

EXAMPLE 1

A zinc oxide varistor having praseodymium oxide as an additive metal oxide (0.5 atom % Pr, 2 atom % Co, 40 ppm Al and 97.5 atom % Zn) and another zinc oxide varistor having bismuth oxide as an additive metal oxide (1 atom % Bi, 1 atom % Co, 15 ppm Al, 0.5 atom % Sb, 0.25 atom % Mn, 0.25 atom % Cr) were video aged for approximately 160 hours at 1 amp/cm$^2$. The video aging signal consisted of a bipolar 60 $\mu$sec square wave pulse every 1.5 msec (FIG. 4), with a voltage sufficient to provide 1 amp current through a 1 cm$^2$ silver electrode painted on each varistor. Each varistor was subjected to this aging signal continuously for one second every 10 seconds (10% duty cycle).

The results are provided in FIG. 5a and 5b, for the praseodymium and the bismuth varistor, respectively. Although both samples show some initial current voltage degradation, the praseodymium sample is clearly superior, both in the extent of initial degradation and in the subsequent degradation as the test progresses. In contrast, the bismuth varistor sample showed continuous degradation over time.

EXAMPLE 2

A praseodymium doped (0.5 atom % Pr, 1 atom % Co, 50 ppm Al) and a bismuth doped (1 atom % Bi, 1 atom % Co, 10 ppm Al, 0.5 atom % Sb, 0.25 atom % Mn, 0.25 atom % Cr) zinc oxide varistor were each video aged in conjunction with a 0.5 in$^2$ encapsulated liquid crystal cell and a 10 k$\Omega$ resistor connected in series. FIG. 6 shows schematically this set-up. The video aging signal consisted of a bipolar 300 $\mu$sec square wave pulse every 1.2 msec, with each sample subjected to this signal continuously for 1 second every 10 seconds (10% duty cycle). The current density was about 1.6 amp/cm$^2$ for the praseodymium doped varistor and 1.5 amp/cm$^2$ for the bismuth doped varistor.

The results are provided in FIGS. 7a and 7b for the praseodymium and bismuth doped varistors, respectively. The results are very similar to those obtained in Example 1—again the praseodymium varistor showed much lesser initial degradation and also much lesser degradation as the test progressed. Our varistors, after 100 hr of exposure to the aging signal of FIG. 4, show an increase in leakage current (measured at 80% of the threshold voltage) of less than ten-fold.

We claim:

1. An article having an array of varistor elements, comprising:
   (a) a varistor body comprising varistor material and having two major opposing faces, one of the opposing faces having an array of indentations thereon, the varistor material comprising zinc oxide as the primary metal oxide and cobalt, praseodymium, and aluminum oxides as additive metal oxides, in amounts of between 0.1 and 8.0 atom % the cobalt, between 0.08 and 8.0 atom % praseodymium, and between 5 and 200 ppm aluminum;
   (b) conductor material on the opposing face having the indentations, the conductor material filling the indentations and forming a plurality of leads for connection to electrical circuitry; and
   (c) conductor material on the other opposing face, forming a plurality of leads for connection to electrical circuitry.

2. An article having an array of varistor elements, comprising a varistor body comprising varistor material and having two major opposing faces, each of the opposing face having an array of indentations thereon, the indentations on each face being in registration with the indentations on the other face, the varistor material comprising zinc oxide as the primary metal oxide and cobalt, praseodymium, and aluminum oxides as additive metal oxides, in amounts of between 0.1 and 8.0 atom % cobalt, between 0.08 and 8.0 atom % praseodymium, and between 5 and 200 ppm aluminum.

3. An article according to claim 2, further comprising conductor material filling the indentations on each surface and forming a plurality of leads for connection to electrical circuitry.

4. An article according to claim 1 or claim 2, wherein the varistor material comprises zinc oxide as a primary metal oxide and bismuth oxide as an additive metal oxide.

* * * * *